United States Patent [19]

Sato

[11] 4,355,333
[45] Oct. 19, 1982

[54] VIDEO SIGNAL PROCESSING CIRCUIT WITH COMB FILTER

[75] Inventor: Ichitaro Sato, Zama, Japan

[73] Assignee: Sony Corporation, Tokyo, Japan

[21] Appl. No.: 257,631

[22] Filed: Apr. 27, 1981

[30] Foreign Application Priority Data

Apr. 28, 1980 [JP] Japan .................................. 55/56814

[51] Int. Cl.³ ......................... H04N 5/14; H04N 5/21; H04N 9/535
[52] U.S. Cl. ...................................... 358/160; 358/31; 358/36; 358/37
[58] Field of Search ................... 358/21 R, 31, 36, 37, 358/39, 40, 160, 167, 168; 360/33

[56] References Cited

U.S. PATENT DOCUMENTS

| | | | |
|---|---|---|---|
| 4,107,736 | 8/1978 | Lowry et al. | 358/36 |
| 4,184,174 | 1/1980 | Aschwanden | 358/31 |
| 4,302,768 | 11/1981 | Kamura et al. | 358/36 |

Primary Examiner—Robert L. Richardson
Attorney, Agent, or Firm—Hill, Van Santen, Steadman, Chiara & Simpson

[57] ABSTRACT

A video signal processing circuit using a comb filter which includes a delay circuit having delay time of one or two horizontal scan intervals. The comb filter has first and second mixing means to split chrominance signals and luminance signals. The first mixing means is provided with the input and output signals of the delay circuit in opposite polarity to each other. The second mixing means is provided with an inverted output of the first mixing means and the non-delayed input of the first mixing means. The separated signals from the first and second mixing means are respectively processed through processing circuits such as noise canceller circuits and emphasis circuits. The two processed signals are mixed in a third mixing means to synthesize a composite color video signal without distortion, false signals or delays at the edges of the input signal.

8 Claims, 21 Drawing Figures

FIG.1 PRIOR ART
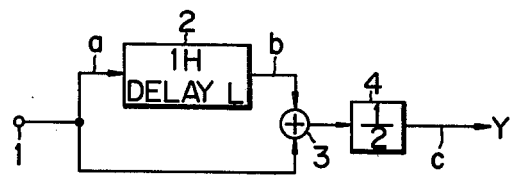
FIG.2A
```
    H1 H2 H3 H4 H5 H6 H7 ----
a   O  O  —  —  —  O  O
b      O  O  —  —  —  O
c   O  —     O  O  —     O
       (½)           (½)
```
FIG.2B
```
    H1 H2 H3 H4 H5 H6 H7 ----
a   O  O  —  —  —  O  O
b      O  O  —  —  —  O
c   O  —  —  —  —  —     O
       (½)           (½)
```
FIG.3 PRIOR ART
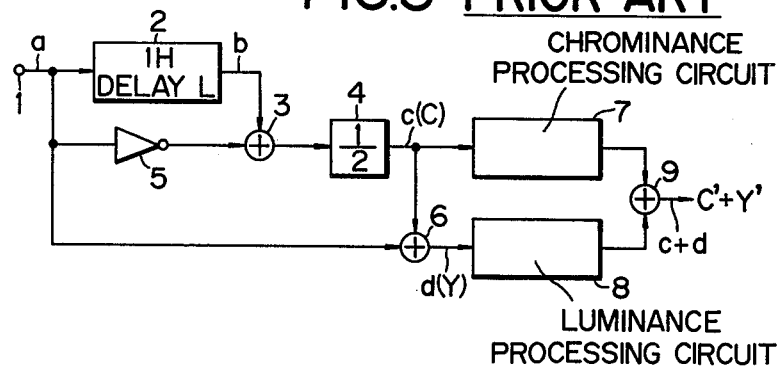

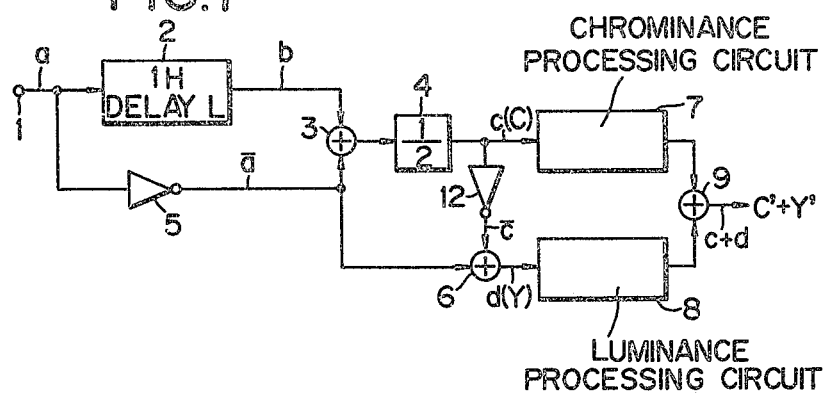
FIG.7
FIG.8
| | H1 | H2 | H3 | H4 | H5 | ------- | H10 | H11 | H12 | H13 | H14 | H15 | --- |
|---|---|---|---|---|---|---|---|---|---|---|---|---|---|
| a | O | O | | | | | | | | O | O | | |
| b | | O | O | | | | | | | | O | O | | |
| ā | O | O | | | | | | | | | O | O | O | |
| c | | O (½) | | | | | | | | O (½) | | O | O | |
| c̄ | | O (½) | | | | | | | | O (½) | | O | O | |
| d | | O (½) | O | O | O | | O | O | O (½) | | O | O | |
| c+d | | O | | | | | | | | | O | O | O | |
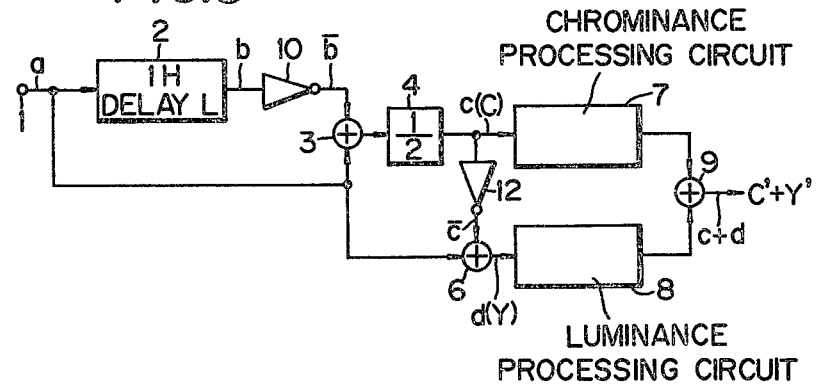
FIG.9

CHROMINANCE PROCESSING CIRCUIT

LUMINANCE PROCESSING CIRCUIT

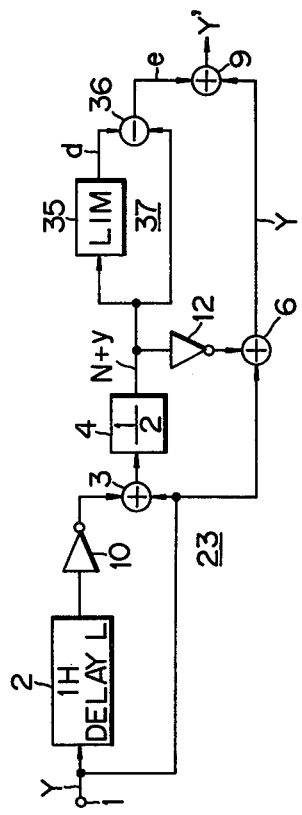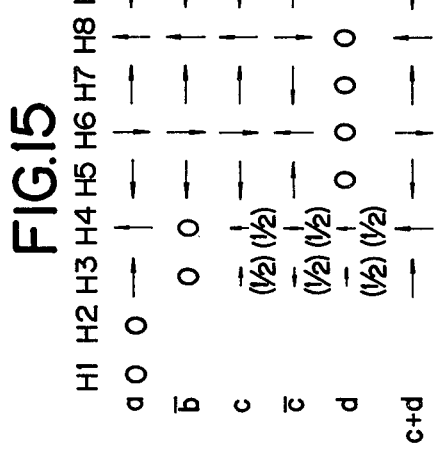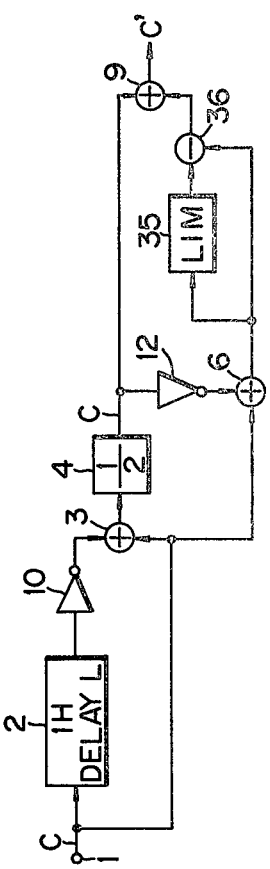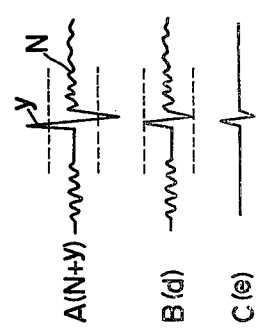

VIDEO SIGNAL PROCESSING CIRCUIT WITH COMB FILTER

BACKGROUND OF THE INVENTION

1. Field of the Invention

This invention relates in general to a video signal processing circuit using a comb filter for obtaining and processing chrominance and luminance signals.

2. Description of the Prior Art

In the prior art it is well known to utilize a comb filter to separate the luminance and chrominance signals from the composite color video signals as, for example, in NTSC color video system utilizing vertical correlation and phase inversion of the chrominance signals. When the NTSC composite color video signals are to be processed, the comb filter must have a delay line of 1H where H is the horizontal period of 63.5 μsec so as to accomplish the vertical correlation between two adjacent scanning lines. Thus, the signals processed by the comb filter are delayed by 1H. Thus, if the comb filter is incorporated in a video tape recorder and dubbing (copy) occurs repetitively, the delay time will accumulate so as to deteriorate the quality of the signals.

When the luminance signals are separated by using the comb filter, the chrominance signals in the portions without the vertical correlation remain in the luminance signal so that the high frequency components of the separated luminance signals must be limited with a low pass filter. Also, the luminance signals in the portion without the vertical correlation will be subjected to distortion and false signals tend to arise. Particularly, the edges of the input signals will be deteriorated. Thus, high frequency components of the luminance signals must be passed through a low pass filter to limit them which results in a degraded picture.

FIG. 1 illustrates a conventional comb filter of the prior art and FIGS. 2A and 2B are vector diagrams of a chrominance signal C and a luminance signal Y that has been processed through the circuit of FIG. 1 for each horizontal line. The symbol O in the vector diagrams represent the state in which no signals are present.

As shown in FIG. 1, a NTSC color video signals a is fed to an input terminal 1 and is passed through a one horizontal period delay line 2. The output b of the delay line 2 and the input signals a are added in an adder 3 so as to obtain vertical correlation. The level of the output of the adder 3 is cut in half by a one-half attenuator 4 and in the output of the attenuator 4 the luminance signals Y are separated. If a subtractor is used instead of the adder 3, the chrominance signals will be separated.

As shown in the vector diagram of FIG. 2A, the phase of the chrominance signal is inverted by the horizontal delay 2. Therefore, if the input signal a and the delay signal b are added together, the resulting output does not in principle contain the chrominance signal as illustrated by c in FIG. 2A. As represented by lines H3 and H6 in FIGS. 2A-C, however, false or spurious signals of the one-half level infiltrate as residual chrominance signals into the luminance signals Y. By adding the input a and the delayed signals b luminance signals Y which do not contain chrominance components can be obtained as shown by c in FIG. 2B provided vertical correlization of the signals occurs. At the leading and trailing edges of the signals, however, the vertical correlation is destroyed by the delay 1H which is indicated by lines H3 and H6 of c in FIG. 2B and the signal level is half and distortion results.

FIG. 3 shows a conventional circuit for processing video signals a utilizing a comb filter in which an 1H delay signal b and an input signal $\bar{a}$ in which the phase has been inverted by an inverter 5 or combined in the adder 3 and the level of the added output is cut in half by the one-half attenuator 4 so as to separate chrominance signals C. Also, the input signal a and the output c of the one-half attenuator 4 are combined in an adder 6 so as to separate the luminance signals Y. The, thus, separated chrominance signals C and the luminance signals Y are supplied to processing circuits 7 and 8 such as emphasis circuits, noise removing filters, noise cancelling circuits and the like and are again added in the adder 9 to form the color video signals C'+Y'.

FIG. 4 comprises a vector diagram of a chrominance signal processed by the circuit of FIG. 3 for each of the horizontal lines. As represented by c in FIG. 4, the level of the leading and trailing portions of the chrominance signal C separated by $\bar{a}+b$ in the adder 3 is halved and is distorted relative to the original signal as indicated by lines H3, and H13. Also, the luminance signal Y separated by c+a in the adder 6 contains a chrominance signal of one-half level as residual components as is indicated on lines H3 and H13 of d in FIG. 4. Therefore, the chrominance signal in the added results C'+Y' produced by the adder 9 will have been corrected for the level distortion at the signal edges as indicated by c+d in FIG. 4, but there will be a delay by 1H relative to the original signal A and it is also inverted in phase.

FIG. 5 illustrates a conventional circuit for processing video signals equipped with the comb filter illustrated in FIG. 3. In this circuit, a delay signal $\bar{b}$ is inverted with an inverter 10 and the input signal a are added in the adder 3 and the separated chrominance signal C and a signal $\bar{a}$ which is obtained by inverting the input signal a with an inverter 11 are added in an adder 6 to obtain luminance signals Y.

The processing circuit of FIG. 5 operates almost the same as that of FIG. 3. The process signals C'+Y' contain chrominance signals with the same phase as that of the input signals a as is indicated by c+d in FIG. 6 but the signal edges are delayed by 1H. Therefore, the color of the picture is shifted in the vertical direction by one line which deteriorates the quality of the picture.

SUMMARY OF THE INVENTION

The primary object of the present invention is to provide a video signal processing circuit which utilize a comb filter without signal delay.

Another object of the present invention is to provide a novel comb filter which eliminates the signal delay relative to the input composite color video signals.

In the video processing circuit utilizing the comb filter according to the present invention, the signals are separated by the comb filter by utilizing the vertical correlation of the video signals. The separated signals are subjected to processing as noise dip, under-chroma recording and reproducing processing and are again synthesized.

The video signal processing circuit of the present invention has the feature that the delay of the synthesized signal are compensated by especially treating the signal portions without the vertical correlation.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIGS. 1–6 illustrate prior art conventional circuits;

FIG. 1 is a block diagram of a prior art comb filter;

FIGS. 2A and 2B are vector diagrams of the chrominance and luminance signals that are processed by the circuit of FIG. 1 for each of the horizontal lines;

FIG. 3 is a block diagram of the prior art for processing video signals utilizing comb filters;

FIG. 4 are vector diagrams of chrominance signals that are processed by the circuit of FIG. 3;

FIG. 5 is a prior art circuit for processing video signals utilizing a comb filter;

FIG. 6 is a vector diagram of chrominance signals processed by the circuit of FIG. 5;

FIG. 7 is a block diagram of a circuit according to the invention for processing video signals utilizing a comb filter according to a first embodiment;

FIG. 8 is a vector diagram of a chrominance signal processed by the circuit of FIG. 7 for each of the lines;

FIG. 9 is a block diagram for processing video signal utilizing a comb filter according to a second embodiment of the present invention;

FIG. 15 is a vector diagram illustrating the phase of the chrominance signals at each location of FIG. 14 for each of the lines;

FIG. 16 is a block diagram of a signal processing circuit in which the comb filter of FIG. 9 is used for improving signal to noise ratio of the luminance signals;

FIGS. 17A, B and C are diagrams of wave forms at different points in the circuit of FIG. 16; and FIG. 18 is a block diagram of a signal processing circuit in which the comb filter of FIG. 9 is used in a circuit for improving the signal to noise ratio of the chrominance signals.

DESCRIPTION OF THE PREFERRED EMBODIMENTS

Figure 4:
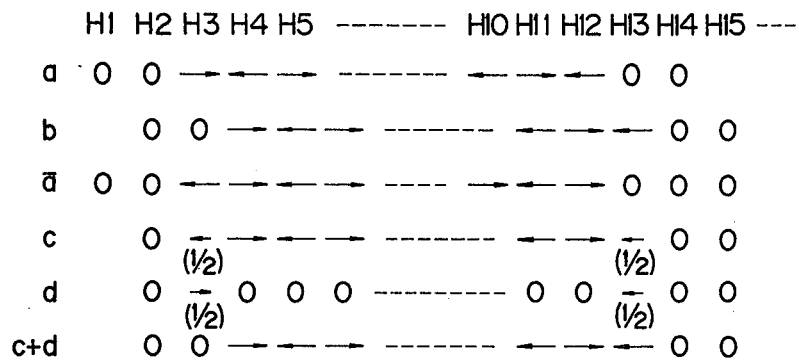

FIG. 7 is a circuit diagram of a video signal processing circuit utilizing a comb filter according to a first embodiment of the invention and FIG. 8 is a vector diagram of the chrominance signal processed by the circuit of FIG. 7 for each of the lines.

As shown in FIG. 7, the video signal a is delayed by a 1H delay line 2 and a signal $\bar{a}$ has been passed through the inverter 5 and these two signals are added in the adder 3. The level is then halved by the one-half attenuator 4 to separate the chrominance signal C which is then passed to the chrominance processing circuit 7. The differential component between the input and output of the delay line 2 is removed as a chrominance signal and its level has been halved. The inverted signal $\bar{c}$ of the separated chrominance signal and the inverted signal $\bar{a}$ are added in an adder 6 so as to separate the luminance signal Y. In other words, a differential component is removed between the input video signals a and the video signal components a' which is contained in the inverted signal $\bar{c}$ but which has not passed through the delay line 2.

Figure 5:
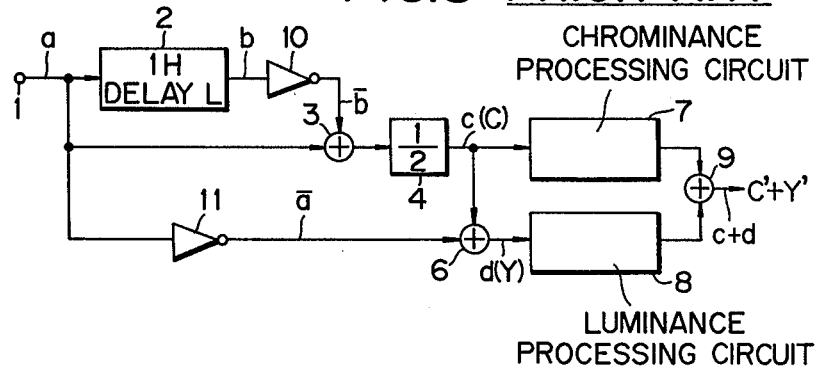
Figure 6:
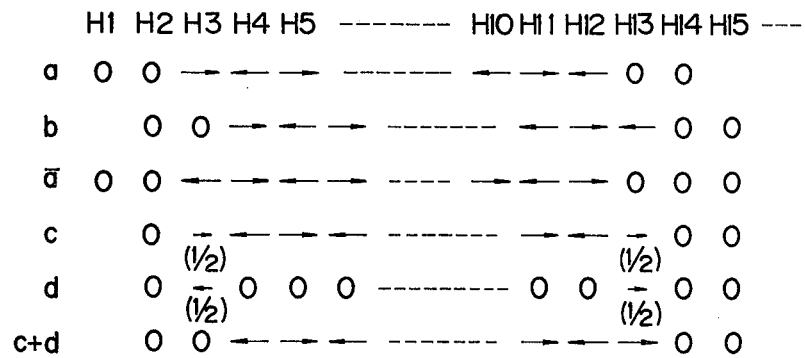

The separated chrominance signal C and the luminance signal Y pass through the processing circuits 7 and 8 which are similar to those illustrated in FIGS. 3 and 5 and are then synthesized using the adder 9.

As in the case indicated by c in FIG. 4, the distortion of one-half the level is generated at the leading and trailing edges of the output c which equals $\bar{a}+b$ (split chrominance signal) of the one-half attenuator 4 as is indicated by c in FIG. 8. In lines H3, H13 residual chrominance component of one-half the level infiltrates into the output $d=\bar{a}+\bar{c}$ (luminance signal) of the adder 6. The residual chrominance component has the same phase as the chrominance of one-half the level of the corresponding scanning line illustrated in c of FIG. 8. Therefore, when the separated chrominance and luminance signals are processed by the processing circuits 7 and 8 and are synthesized through the adder 9, the chrominance signal in the synthesized color video signals will be as indicated by c+d in FIG. 8. Distortion does not develop at the edges of the signals relative to the original input signal a and the delay of 1H does not occur. Thus, color blurring will not occur in the picture and the picture will be of high quality.

In the embodiment of FIG. 7, however, the processed chrominance signals c+d is inverted in phase with respect to the original signal a. The delay of 1H does not develop at the leading and trailing edges of the signals. The content of the chrominance signal, however, is delayed by 1H in the middle portion thereof.

Figure 10:
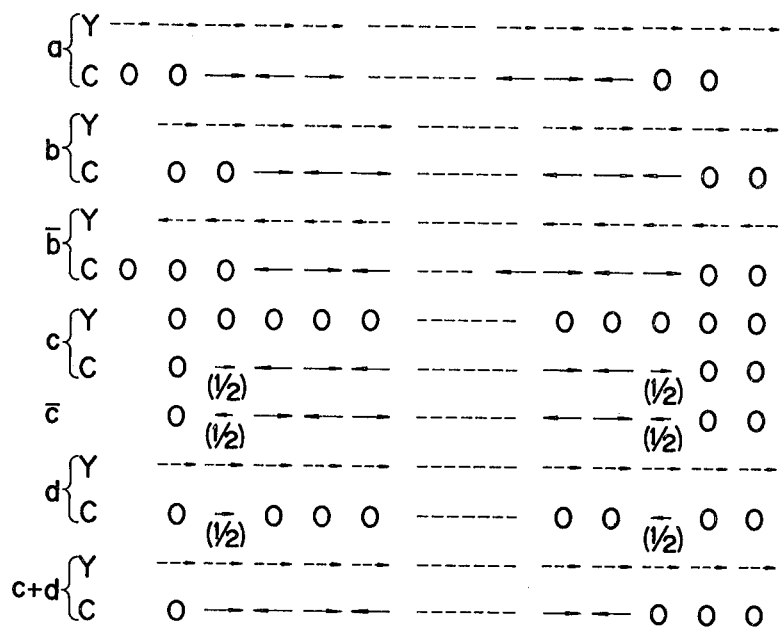
FIG. 10 is a vector diagram of a luminance and chrominance signals processed by the circuit of FIG. 9.

FIG. 9 illustrates a video signal processing circuit similar to that of FIG. 7 which employs a comb filter according to a second embodiment of the invention. FIG. 10 is a vector diagram of the luminance and chrominance signals that will be processed by the circuit of FIG. 9.

In the embodiment of FIG. 9, the input a is passed through the 1H delay line 2 and then through an inverter 10 to obtain a signal $\bar{b}$ which is then added in an adder 3 with the original signal a. The level is then halved by passing it through the attenuator 4 to separate the chrominance signal C. Also, a signal $\bar{c}$ is obtained by inverting the chrominance signal by passing it through an inverter 12 and such signal is then combined with the original signal a in the adder 6 so as to separate the luminance signal Y. The signals C and Y are respectively applied to the processing circuits 7 and 8 and the outputs of such circuits are combined in the adder 9 to obtain the desired chrominance and luminance signals.

In principle, the circuit of FIG. 9 operates in the same manner as the circuit of FIG. 7 such that the level of a differential component between the input and output of the delay line 2 is halved and removed. Also, the signal component $\bar{a}$ which is contained in the inverted signal of the removed signal and which has not been delayed and the original signal a are added together so that the differential component between them can be removed.

As shown in FIG. 10, solid lines represent a vector diagram of the chrominance component at each portion of FIG. 9 and the dashed lines represent a vector diagram of the luminance component.

Distortion of one-half the level develops at the edges of the output c of the one-half attenuator 4. Furthermore, the residual chrominance component of one-half the level infiltrates into the luminance signal Y which is the dashed line d in FIG. 10 of the output d at the adder 6 as is indicated by a solid line at lines H3 and H13. The residual chrominance component is in phase with the chrominance signal of the line which corresponds to FIG. 10c. Similar to the embodiment of FIG. 7, therefore, the chrominance signal in the video signal C'+Y' which is synthesized does not develop distortion at the edges or does not develope the delay of 1H as is indicated by solid lines c+d in FIG. 10. Also, the luminance signal in the process signal C'+Y' does not contain false signals as indicated by the dashed line c+d.

Figure 11:
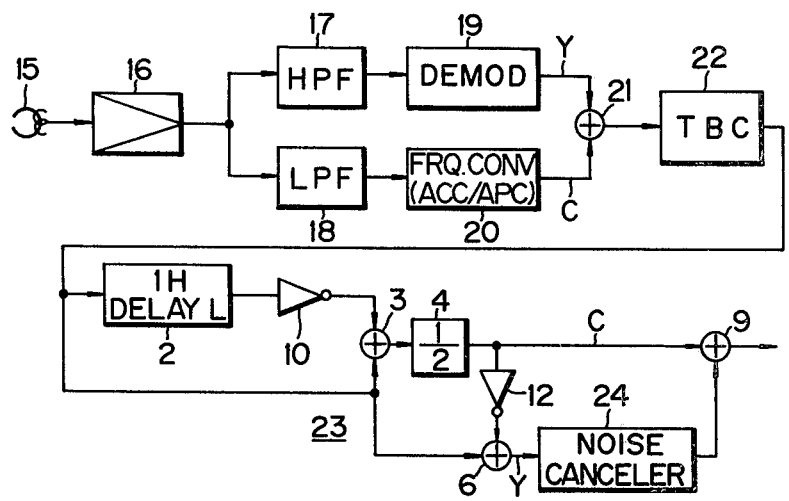
FIG. 11 is a block diagram of a signal processing circuit in the reproduction system of a VTR using the comb filter of FIG. 9.

FIG. 11 is a block diagram of a signal processing circuit in the reproduction system of a video tape recorder VTR and illustrates one embodiment for practising the comb filter of FIG. 9 in which a reproduced signal obtained from a video head 15 is supplied to an amplifier 16 and then to a high pass filter 17 to an FM demodulator 19 to obtain a luminance signal Y. The output of the amplifier 16 is also passed through a low pass filter 18 and through a frequency converter 20 which is a heterodyne circuit with an automatic color control circuit ACC and an automatic phase control circuit APC.

The demodulated luminance signal Y and the converted chrominance signal C are synthesized in an adder 21 and jitter components are removed in a time base collector TBC 22. The output of the time base collector 22 is supplied to a comb filter 23 which is constructed in the same manner as the one illustrated in FIG. 9 and includes a delay line of 1H and an inverter 10 and an adder 3. The chrominance signal is obtained from the output of the one-half attenuator 4 which receives the input of the adder and an inverter 12 receives the output of the attenuator 4 and supplies the input to an adder 6 which also receives the incoming signal. The output of the adder 6 is the luminance signal Y which is then supplied to a noise canceller 24 of the well known type and the output of the noise canceller 24 is combined in the adder C with the chrominance signal C to form the composite color video signal.

In the processing circuit of FIG. 11, the 1H delay line 2 may generally be made of glass. By using the comb filter it is known that the signal to noise ratio of the split chrominance signal C and the luminance signal Y are respectively improved by about 3 dB. The signal to noise ratio previously had been improved by the noise canceller 24 by about 6 dB. By using the comb filter 23 of this invention, the signal to noise ratio need only be improved by the noise canceller 24 by only 3 dB. Thus, the signal losses by the noise canceller are reduced and it is possible to obtain reproduced pictures having higher resolution than those of the prior art.

When the delay line made of glass is to be used as the comb filter 23, the time base collector 22 can be preferably employed since signals are less deteriorated than when the dubbing is repeated. Usually, however, it is not required that a time base collector 22 be utilized. When a variable delay line such as a CCD is used as the delay line 2 it is not necessary to employ the TBC 22 and good results can be obtained even when jitter is increased by repetition of dubbing. FIG. 11 circuit does not result in signal edges being delayed and false signals are not developed for the video signals that are recomposed with the comb filter 23 and the noise canceller 24. Thus, the signals are not deteriorated no matter how many times the dubbing is repeated.

Figure 12:
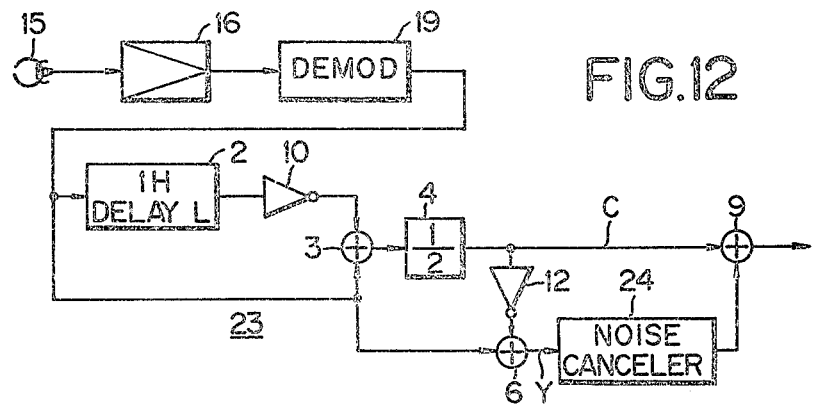
FIG. 12 is a block diagram of a circuit in which the comb filter of FIG. 9 is used for a reproduction system of a VTR of a direct FM recording type.

FIG. 12 is a block diagram of a signal processing circuit in the reproduction system of a VTR in which the color video signals are recorded by direct frequency modulation.

In the circuit of FIG. 12, the reproduced output of the head 15 is supplied through the amplifier 16 to an FM demodulator 19 where the signals are directly demodulated into color video signals. Then the output of the demodulator is passed through the 1H delay 2 then through the inverter 10 to the adder 3. The one-half attenuator 4 receives the output of the adder and provides a chrominance signal C and an inverter 12 supplies the output of the attenuator 4 to an adder 6 which also receives the input signal and produces a luminance signal Y. A noise canceller 24 receives the output of the adder and supplies an input to the adder 9 which also receives the chrominance signal C to produce the synthesized signal. Noise is removed from the luminance component by the noise canceller 24.

Figure 13:
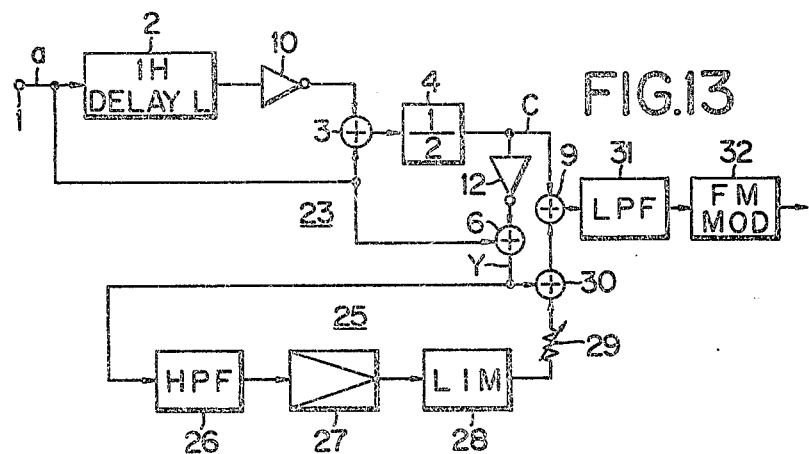
FIG. 13 is a block diagram of a signal processing circuit in the recording system of a VTR utilizing the comb filter of FIG. 9.

FIG. 13 is a block diagram of a signal processing circuit in the recording system of a VTR utilizing the comb filter of FIG. 9. The processing circuit can be used for the VTR of the direct FM recording system for which the reproducing system is shown in FIG. 12. According to this system, the chrominance signal and the luminance signal are not separated. Therefore, it is not possible to emphasize the high frequency component of the luminance signal in order that the resolution of the reproduced signal will not be deteriorated. By using the comb filter of the present invention, however, it is possible to process the signals without deteriorating or delay of signals or developing the false signals described above.

As shown in FIG. 13, it is possible to insert a detail high frequency and small amplitude signal emphasis circuit 25 for the luminance signals.

In FIG. 13, the input video signals a is separated into luminance signals Y and chrominance signal C in the comb filter 23. The split luminance signal Y is fed to the detail emphasis circuit 25. High frequency components of the luminance signal are extracted in the high pass filter 26 and the high frequency components are fed to a limiter 28 through an amplifier 27 where the signal components of large amplitudes are suppressed. The output of the limiter is fed to an adder 30 through an attenuator 29 and is added to the luminance signal Y. Consequently, the high frequency and small amplitude signals in the separated luminance signals are emphasized. The output of the adder 30 is added to the chrominance signal in the adder 9 and the output of the adder 9 is fed to a FM demodulator through a low pass filter 31 and the modulated output is recorded with a video head.

Figure 14:
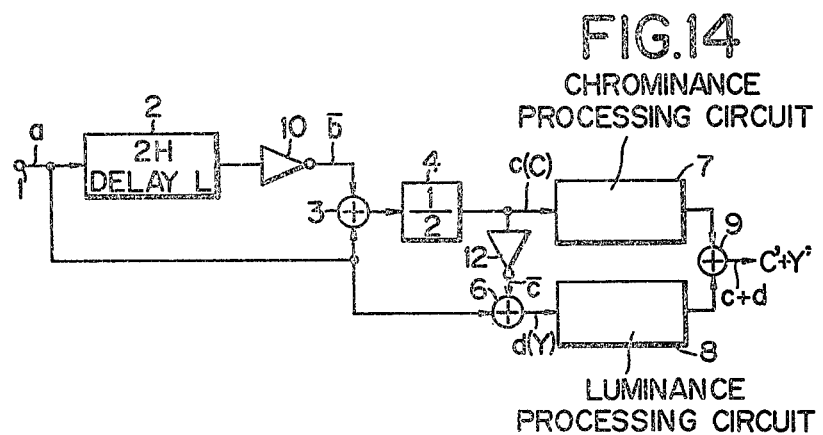
FIG. 14 is a block diagram of a video processing circuit which includes an embodiment of the comb filter for processing PAL signals.

FIG. 14 is a block diagram of a video signal processing circuit utilizing a comb filter for separating the PAL signals into luminance signals Y and chrominance signals C. FIG. 15 is a vector diagram illustrating the phases of the chrominance signal at each of the portions of FIG. 14 for each scanning period H.

When PAL signals are to be treated, a 2H delay line 2 is used in the comb filter and the input signal from terminal 1 is supplied through the 2H delay line 2 to the inverter 10 which supplies its output to the adder 3 and also receives an input from terminal 1. A one-half attenuator 4 receives the output of the adder and produces a chrominance signal C which is supplied to a chrominance processing circuit 7. An adder 6 also receives the input signal from the terminal 1 as well as the output of an inverter 12 which receives an output from the attenuator 4 and the adder produces a luminance signal Y which is supplied to a luminance processing circuit. An adder 9 receives the output of the processing circuits 7 and 8 and produces the luminance and chrominance signals C′+Y′.

The phase of the chrominance signal of the PAL signal changes by 90° every horizontal scanning period H as indicated by a in FIG. 15. The operation of the circuit of FIG. 14 operates somewhat similar to the circuit of FIG. 9. As indicated by c+d of FIG. 15, the chrominance component in the composite video signal C′+Y′ after being processed is free from delay as well as free from distortion and is not inverted in phase and does not include false signals relative to the original signal a.

FIG. 16 is a block diagram of a signal processing circuit in which the comb filter of FIG. 9 is used for improving the signal to noise ratio of luminance signals and FIGS. 17A, B and C illustrate wave forms for illustrating the operation of the circuit of FIG. 16.

Luminance signals Y are fed to the input terminal 1 of FIG. 16 and like the circuit of FIG. 9, a luminance signal Y having vertical correlation is obtained from the output of the adder 6 of the comb filter 23. The comb filter 23 also has the delay line 2, the inverter 10, adder 3, attenuator 4 and inverter 12 and adder 6 as described previously. In addition, a signal without vertical correlation, a luminance signal y without noise N or correlation illustrated by A in FIG. 17 is obtained from the output of the one-half attenuator 4. The signal N+y without the vertical correlation is fed to a noise canceller circuit 37 which consists of a limiter 35 and a subtractor 36. The subtractor receives the output d of the limiter 35 and also receives the input to the limiter 35. Since the noise N has been separated from the luminance signals Y, the noise canceller 37 does not require a high pass filter in order to extract the high frequency noise components.

The signal N+y supplied to the noise canceller 37 is fed to the limiter 35 where the signal components y of an amplitude which exceeds a limiter level indicated by a dashed line is suppressed as indicated in FIG. 17B. The output d of the limiter 35 is added to the original signal N+y in an opposite phase thereto in the subtractor 36 so that the noise component N is cancelled as indicated in FIG. 17C. In this case, the signal component y is attenuated to some extent. The output e of the subtractor 36 is added to the luminance signal Y and the adder 9. A luminance signal Y′ in which noise has been removed is obtained from the output of the adder 9. The signal Y′ does not contain distortion or false signals. In addition, the signal y without correlation is restored as in the input signals. Also the signal to noise ratio of the output Y of the adder 6 is improved by 3 dB as it passes through the comb filter 23. Consequently, the signal to noise ratio of the output Y′ of the adder 9 is also improved by 3 dB.

FIG. 18 illustrates a signal processing circuit similar to FIG. 16 for improving the signal to noise ratio of chrominance signals. The chrominance signal C is supplied to the input terminal 1 and passes through a 1H delay line 2 and then through an inverter 10 to an adder 3 which also receives an input from the input terminal 1. A one-half attenuator 4 is connected to the output of the adder 3 and supplies a chrominance signal C to an inverter 12 which supplies an input to an adder 6 that also receives an input from input terminal 1. A limiter 35 is connected to the output of the adder 6 and supplies input to a subtractor 36 which also receives the output of the adder 6. The output of the subtractor 36 is supplied to an adder 9 which also receives the output of the one-half attenuator 4 to produce an improved chrominance signal C′. According to the above described embodiments, the input signal and output signal of a delay circuit having delay time of one or two horizontal scanned intervals are added in opposite polarity to each other by a first adder. An inverted signal with respect to the output of the first adder and the input signal are added with a second adder. The two separated signals from the first and second adders are respectively processed through processing circuits such as noise cancellers, emphasis circuits and the like. The two process signals are added together with a third adder to synthesize again a composite signal without distortion false signals or delays at the edges of the input signal and the improved chrominance and luminance signals are thus produced.

Although the invention has been described with respect to preferred embodiments, it is not to be so limited as changes and modifications can be made which are within the full intended scope of the invention as defined by the appended claims.

I claim as my invention:
1. A video signal processing circuit comprising:
   (A) an input circuit to which an incoming video signal is applied,
   (B) a delay circuit connected to said input circuit for delaying said video signal corresponding to n horizontal scan intervals of said video signal, where n is 1 or 2,
   (C) a first mixing means connected to an output of said delay circuit and said input circuit for mixing the non-delayed video signal and the delayed video signal in opposite polarity to each other,
   (D) a second mixing means connected to an output of said first mixing means and to said input circuit for mixing said incoming video signal and an inverted output signal from said first mixing means, and
   (E) a third mixing means connected to said output of said first mixing means and to an output of said second mixing means for deriving an output video signal without delay.

2. A video signal processing circuit as claimed in claim 1, wherein said second mixing means includes an inverter and an adder, and the output of said first mixing means is supplied to the adder through the inverter for achieving opposite polarity mixing.

3. A video signal processing circuit as claimed in claim 1 including a noise cancelling circuit in a signal path from the output of said second mixing means to said third mixing means.

4. A video signal processing circuit as claimed in claim 2, wherein said second mixing means includes an adder and an attenuator, and an output from the adder of the second mixing means is attenuated to one-half its level.

5. A video signal processing circuit as claimed in claim 1, further comprising signal process circuit means provided in the signal path between said second and third mixing means and the signal path of the output of said first mixing means.

6. A video signal processing circuit as claimed in claim 4 including signal process circuit means in the signal path between said attenuator and said third mixer and in the signal path between said second and third mixing means.

7. A video signal processing circuit according to claim 1 including a limiter and a subtractor between said first and third mixing means.

8. A video signal processing circuit according to claim 1 including a limiter and a subtractor between said second and third mixer.

* * * * *